US 6,401,453 B1

(12) United States Patent
Lemire

(10) Patent No.: US 6,401,453 B1
(45) Date of Patent: Jun. 11, 2002

(54) METHOD AND DEVICE FOR MONITORING THE FUNCTIONAL ABILITY OF A CATALYST OF AN INTERNAL COMBUSTION ENGINE

(75) Inventor: Bertrand Lemire, Schierling (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/666,527

(22) Filed: Sep. 18, 2000

Related U.S. Application Data

(63) Continuation of application No. PCT/DE99/00692, filed on Mar. 12, 1999.

(30) Foreign Application Priority Data

Mar. 17, 1998 (DE) .......................................... 198 11 574

(51) Int. Cl.$^7$ .................................................. F01N 3/00
(52) U.S. Cl. .............................. 60/277; 60/274; 60/276; 60/297
(58) Field of Search .......................... 60/276, 274, 277, 60/285, 297; 73/118.1; 701/109

(56) References Cited

U.S. PATENT DOCUMENTS

| 5,526,643 | A | * | 6/1996 | Mukaihira et al. ............ 60/276 |
| 5,626,014 | A | * | 5/1997 | Hepburn et al. .............. 60/274 |
| 5,649,420 | A | * | 7/1997 | Mukaihira .................... 60/274 |
| 5,675,967 | A | * | 10/1997 | Ries-Mueller ................ 60/274 |
| 5,715,676 | A |   | 2/1998 | Schnaibel et al. |
| 5,729,971 | A | * | 3/1998 | Matsumo et al. ............. 60/277 |
| 5,802,843 | A | * | 9/1998 | Kurihara et al. ............. 60/274 |
| 5,833,979 | A |   | 11/1998 | Hamburg et al. |
| 5,938,715 | A | * | 8/1999 | Zhang et al. ................ 701/109 |
| 6,145,302 | A | * | 11/2000 | Zhang et al. ................. 60/274 |

FOREIGN PATENT DOCUMENTS

| DE | 2444334 |  | 3/1976 |
| DE | 4039429 | A1 | 6/1992 |
| DE | 4433988 | A1 | 4/1995 |
| DE | 19500619 | A1 | 8/1995 |
| DE | 19536252 | A1 | 4/1996 |
| DE | 19537788 | A1 | 4/1997 |
| DE | 19643674 | A1 | 4/1997 |
| DE | 19645477 | A1 | 5/1997 |
| DE | 19645202 | A1 | 6/1997 |
| DE | 19701355 | A1 | 7/1997 |
| EP | 0756071 | A2 | 1/1997 |

* cited by examiner

Primary Examiner—Thomas Denion
Assistant Examiner—Binh Tran
(74) Attorney, Agent, or Firm—Laurence A. Greenberg; Werner H. Stemer; Gregory L. Mayback

(57) ABSTRACT

A method and device for checking the functional ability of a catalyst in an exhaust duct of an internal combustion engine is described. The method and device determines a degree of conversion as a function of the temperature of the catalyst during a heating-up phase. Evaluation of the relationship between the degree of conversion and the temperature, the relationship changing with the age of the catalyst, allows a non-functional catalyst to be checked and diagnosed with high accuracy.

19 Claims, 4 Drawing Sheets

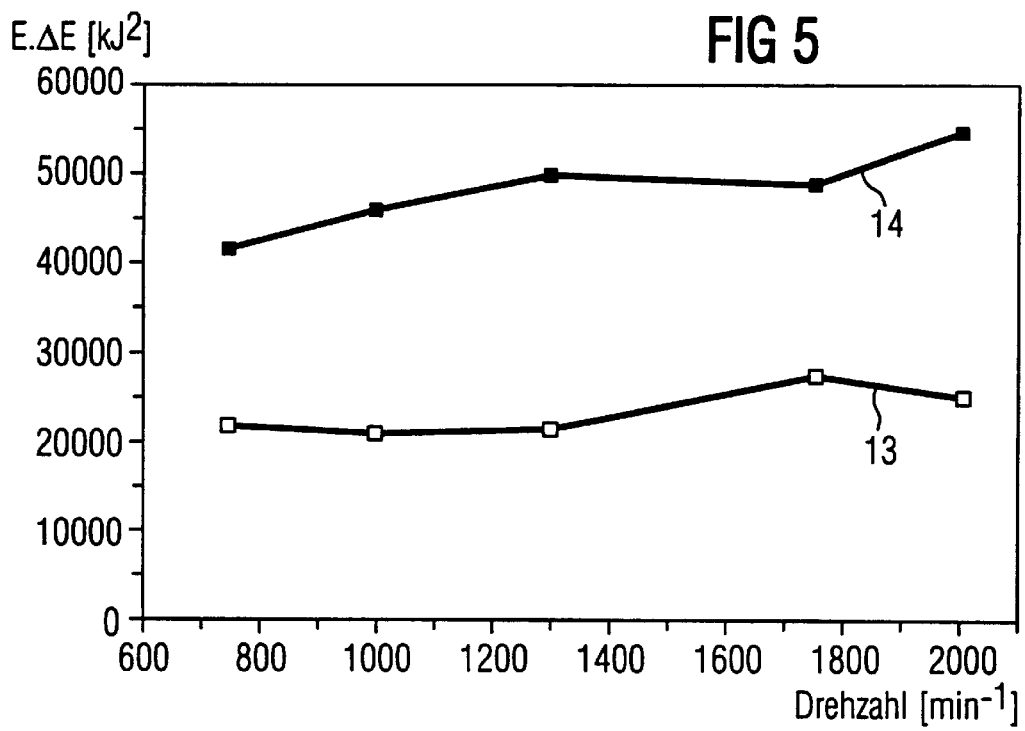
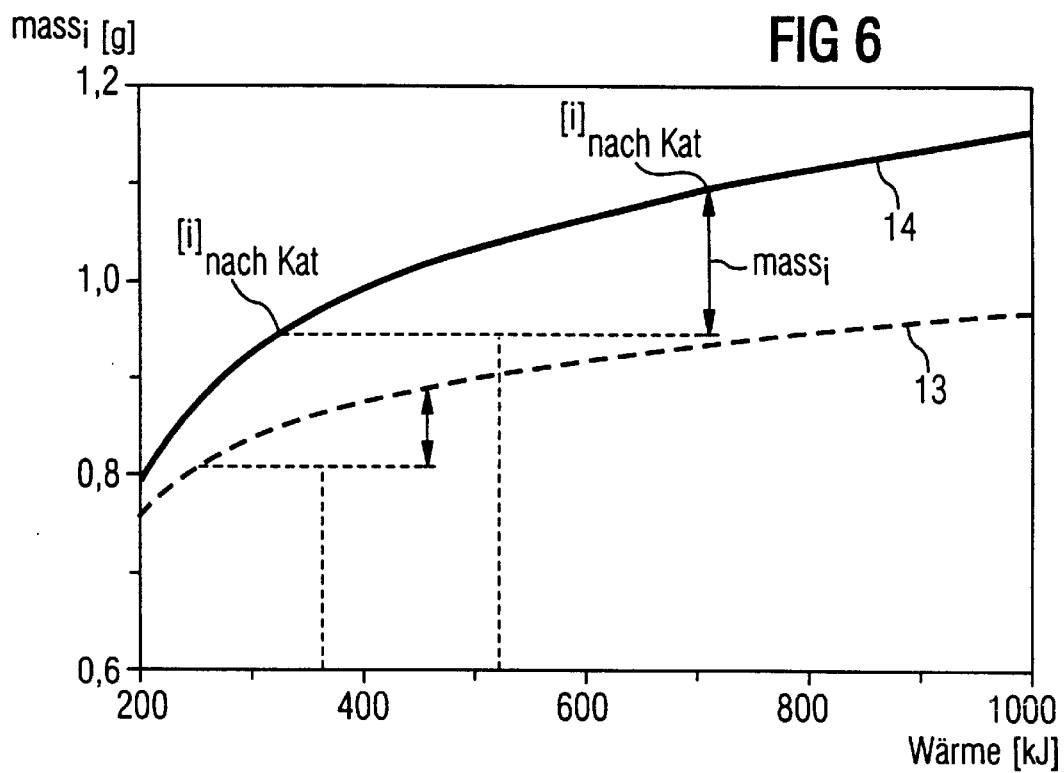

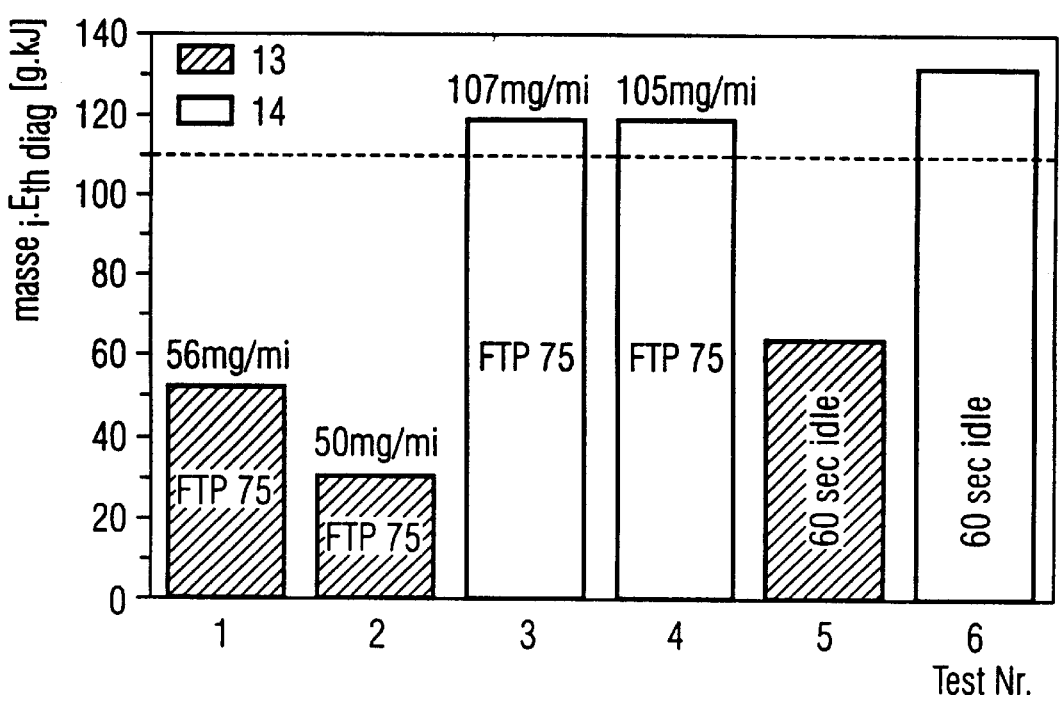

METHOD AND DEVICE FOR MONITORING THE FUNCTIONAL ABILITY OF A CATALYST OF AN INTERNAL COMBUSTION ENGINE

CROSS-REFERENCE TO RELATED APPLICATION

This is a continuation of copending International Application PCT/DE99/00692, filed Mar. 12, 1999, which designated the United States.

BACKGROUND OF THE INVENTION

FIELD OF THE INVENTION

The invention relates to a method and an apparatus for monitoring the functional ability of a catalyst disposed in the exhaust duct of an internal combustion engine.

Nowadays, aftertreatment of the exhaust gas of internal combustion engines is generally performed by one or more catalysts in an exhaust system of the internal combustion engine. Strict emission limits for pollutant emissions of internal combustion engines, particularly vehicles, make it necessary that the catalyst used should be monitored reliably. It is required of such diagnostic methods that they should allow continuous checking of the catalyst in operation, also referred to as On-Board-Diagnosis.

A catalyst-monitoring method known for spark-ignition engines is based on evaluating the relationship between the oxygen storage capacity and degree of conversion of a three-way catalyst. A method of this kind is known, for example, from Published, Non-Prosecuted German Patent Application DE 195 36 252 A1; here, two oxygen or lambda probes are used, one upstream and one downstream of the catalyst. This method can only be used when the lambda control system is active and the catalyst has reached its operating temperature. Evaluating the lambda-probe signals allows only indirect monitoring of the catalyst, and the correlation between the oxygen storage capacity and the degree of conversion of the catalyst is not very good. This method, like that known from Published, Non-Prosecuted German Patent Application DE 24 44 334 A1, is therefore restricted to the diagnosis of relatively large differences in the degree of conversion, as a result of which it is possible to diagnose only a severe deterioration of the catalyst. These methods are not suitable for diagnosing a slight deterioration of the catalyst, as required by strict emission limits.

A method known from Published, Non-Prosecuted German Patent Application DE 40 39 429 A1 adopts a different approach to the checking of a catalyst. It provides a carbon-monoxide and/or hydrogen-concentration pick-up downstream of the catalyst. When a specified limiting value of the carbon-monoxide and/or hydrogen content is exceeded, a defective catalyst is recognized. The measurements are taken in defined steady-state operating conditions of the internal combustion engine, i.e. when the catalyst is at its maximum degree of conversion.

Published, Non-Prosecuted German Patent Application DE 195 37 778 A1 has disclosed a method for monitoring the operation of a $NO_x$-reducing catalyst of a diesel internal combustion engine, in which fuel is metered in upstream of the catalyst as a reducing agent. Here, a sensor for the concentration of hydrocarbons in the exhaust gas is provided downstream of the $NO_x$-catalyst for the purpose of monitoring the catalyst so as to be able to recognize lessening of the catalytic reduction from increased hydrocarbon concentrations in the exhaust gas. In normal operation, i.e. after the operating temperature has been reached, precise control of an internal combustion engine with catalysts in the exhaust duct allows very high degrees of conversion, e.g. over 95%. Strict emission limits allow only slight deviations from this almost complete conversion, for which reason the on-board diagnostic (OBD) system must be capable of detecting even slight deviations.

SUMMARY OF THE INVENTION

It is accordingly an object of the invention to provide a method and device for monitoring the functional ability of a catalyst of an internal combustion engine which overcome the above-mentioned disadvantages of the prior art devices and methods of this general type, in which even a slight deterioration in the degree of conversion due to aging can be detected very accurately.

With the foregoing and other objects in view there is provided, in accordance with the invention, a method for monitoring a functional ability of a catalyst disposed in an exhaust duct of an internal combustion engine. The method includes the steps of: determining by continuous measurements during a heating-up phase of the catalyst, a first variable that is characteristic of a temperature of the catalyst; determining by continuous measurements during the heating-up phase of the catalyst, a second variable that is characteristic of a degree of conversion of the catalyst and is dependent on the first variable; and using a change in a dependency of the second variable on the first variable caused by aging of the catalyst to monitor the functional ability of the catalyst.

According to the invention, the functional ability of the catalyst is checked during the warm-up phase of the internal combustion engine. Since the largest proportion of pollutants emitted is emitted during the warm-up phase of the internal combustion engine, checking the functioning of the catalyst is particularly important during this period. On the other hand, it is easier to diagnose changes in the functional ability of the catalyst owing to the higher concentration of pollutants in the exhaust gas downstream of the catalyst during the warm-up phase.

The basic idea of the method according to the invention and of the device according to the invention is based on the relationship between the degree of conversion and the level of emission of an exhaust-gas component downstream of the catalyst to be monitored and the thermal properties, i.e. the temperature, of the catalyst. The degree of conversion of the catalyst depends directly on its temperature. This dependency changes with the aging of the catalyst. The degree of conversion becomes poorer as the age of the catalyst increases. This change in the dependency of the degree of conversion of the catalyst on its temperature with aging thus offers a way of monitoring the functional ability of the catalyst.

The thermal property of the catalyst can be expressed by the body temperature of the catalyst itself or by the heat fed to the catalyst. The latter can be accomplished by determining the exhaust-gas temperature upstream of the catalyst and determining the volume flow fed to the catalyst and subsequently calculating the heat fed to the catalyst from the exhaust-gas temperature, the volume of flow and the heat capacity of the exhaust gas. Energy supplied by any catalyst heating system present must, of course, likewise be taken into account. The exhaust-gas temperature upstream of the catalyst can preferably be calculated by a model and on operating parameters of the internal combustion engine. The heat fed to the catalyst is furthermore preferably determined only when no more latent heat is being absorbed by the evaporation of condensates in the catalyst after the starting of the internal combustion engine.

In the invention, the catalyst is preferably monitored using measurements of one pollutant component, in particular carbon monoxide (CO), hydrocarbon (HC) or nitrogen oxides $NO_X$. However, it is also possible for a plurality of these pollutant components to be taken into account.

In one embodiment of the invention, the concentration of a pollutant component in the exhaust gas is measured upstream and downstream of the catalyst. The degree of conversion of the catalyst is calculated from these measured values. In one embodiment of the method according to the invention, inadequate functioning of the catalyst is detected when the catalyst temperature is above a threshold value at a given degree of conversion. As an alternative, this is also possible if a minimum degree of conversion is not reached at a given catalyst temperature. If the heat fed to the catalyst is used as a measure of the temperature of the catalyst, a non-functional catalyst can be detected by determining the energy required to increase the degree of conversion of the catalyst from an initial value $\eta_i$, e.g. 20%, to a final value $\eta_f$, e.g. 60%. The energy required to achieve the increase in the degree of conversion $\eta_f-\eta_i$, which has to be fed to the catalyst in the form of heat, is higher in the case of an aged, non-functional catalyst than in the case of a new, functional catalyst. The mean value of these energies likewise increases with the aging of the catalyst. The product of the mean value of the energy and the energy fed in is consequently a measure of the warm-up behavior of the catalyst and hence of its ability to function. Catalyst diagnosis can be carried out in a simple manner by setting a threshold value for this product. If the threshold value is exceeded, the catalyst is recognized as being non-functional. To take account of thermal boundary conditions of the system, it is preferably possible to choose the diagnostic threshold as a function of temperature values of the internal combustion engine, e.g. coolant temperature, intake-air temperature, outside temperature or exhaust-gas temperature when the internal combustion engine is started from a characteristic diagram. The driving profile of a vehicle with which the internal combustion engine is equipped, which can influence the heating up of the catalyst, can likewise be taken into account by use of a correction factor.

In one embodiment, a measurement of the pollutant concentration upstream of the catalyst is dispensed with; instead, only the concentration of one of the pollutant components downstream of the catalyst is measured. For the purpose of diagnosis, the heat fed to the catalyst or the change in the solid-body temperature which is required to reduce the concentration of the pollutant component to be monitored from an initial value $[I]_i$ to a final value $[i]_f$ is determined. Since the concentration per se is not a direct measure of the quantity of pollutant emitted, it is combined with the quantity of exhaust gas, and the mass of the pollutant component is determined. The better the warm-up behavior of the catalyst, the lower is the mass emitted during the supply of a given amount of heat or during a specified change in the solid-body temperature of the catalyst. When a certain threshold value is exceeded, the catalyst is recognized as being non-functional. The emitted mass is preferably multiplied by the mean thermal energy supplied, in order to take account of the variation with time in the energy supplied, e.g. load influences. The product of the mass emitted and the energy supplied is then a measure of the ability to function as a catalyst and, when a threshold value is exceeded, the catalyst is recognized as effective. To take account of the thermal boundary conditions of the system, the diagnostic threshold is, here too, preferably defined as a function of temperature values of the internal combustion engine, e.g. coolant temperature, intake-air temperature, outside temperature or exhaust-gas temperature when the internal combustion engine is started. The driving profile of a vehicle, with which the internal combustion engine is equipped, can also be taken into account during the method by a correction factor.

It should be pointed out that the method according to the invention and the device according to the invention can be used for all types of catalyst, such as reduction catalysts, oxidation catalysts, in particular regulated three-way catalysts, storage catalysts or absorbers and for spark-ignition and diesel internal combustion engines.

In accordance with an added feature of the invention, there is the step of using a body temperature of the catalyst as the first variable or using the heat fed to the catalyst as the first variable.

In accordance with an additional feature of the invention, the heat fed to the catalyst is determined by the following steps: determining an exhaust-gas temperature upstream of the catalyst; determining a volume flow of exhaust gas fed to the catalyst; and calculating the heat fed to the catalyst from the exhaust-gas temperature, the volume flow and a heat capacity of the exhaust gas.

In accordance with another feature of the invention there is the step of determining the heat fed to the catalyst only, after a cold start of the internal combustion engine, when no more latent heat is being absorbed due to an evaporation of condensates in the catalyst.

In accordance with a further feature of the invention, there is the step of calculating the exhaust-gas temperature upstream of the catalyst by use of a model based on operating parameters of the internal combustion engine.

In accordance with a further added feature of the invention, there is the step of using a value for the heat fed to the catalyst which has been corrected with respect to external influences by a correction factor as the first variable.

In accordance with a further additional feature of the invention, there is the step of using the degree of conversion of the catalyst as the second variable.

In accordance with yet another feature of the invention, there is the step of detecting a concentration of at least one pollutant component in an exhaust gas downstream of the catalyst for determining the second variable.

In accordance with another added feature of the invention, there is the step of detecting a further concentration of the pollutant component in the exhaust gas upstream of the catalyst, and the degree of conversion of the catalyst is determined from a difference between the concentration and the further concentration.

In accordance with another additional feature of the invention, there is the step of using a mass of at least one pollutant component in an exhaust gas downstream of the catalyst as the second variable.

In accordance with an added feature of the invention, the following steps are performed for determining the mass of the pollutant component: determining an exhaust-gas volume flow fed to the catalyst; converting the exhaust-gas volume flow into a mass flow; and calculating a product of the mass flow and a concentration of the pollutant component in the exhaust gas downstream of the catalyst and integrating the product.

In accordance with an additional feature of the invention, there is the step of multiplying the mass of the at least one pollutant component in the exhaust gas downstream of the catalyst by the first variable resulting in a product, and using the product to monitor the functional ability of the catalyst.

In accordance with another feature of the invention, there is the step of determining the dependency of the second variable on the first variable at a specified point.

In accordance with another feature of the invention, there is the step of setting a threshold value of the second variable at a specified value of the first variable and, when the threshold value is undershot, inadequate functional ability of the catalyst is diagnosed, the specified value of the first variable lying in a range in which aging of the catalyst causes a large change in the second variable.

In accordance with a further feature of the invention, there is the step of setting a threshold value of the first variable at a specified value of the second variable and, when the threshold value is exceeded, inadequate functional ability of the catalyst is diagnosed, the specified value of the second variable lying in a range in which aging of the catalyst causes a large change in the first variable.

In accordance with a further added feature of the invention, there is the step of determining a change in the second variable in an interval of the first variable and, when a specified threshold value of the second variable is undershot, inadequate functional ability the catalyst is diagnosed.

In accordance with a further additional feature of the invention, there is the step of determining a change in the first variable in an interval of the second variable and, when a specified threshold value for the change in the first variable is exceeded, inadequate functional ability of the catalyst is diagnosed.

In accordance with another additional feature of the invention, there is the step of multiplying the change in the first variable by a mean value of the first variable before comparison with the threshold value.

With the foregoing and other objects in view there is further provided, in accordance with the invention, a device for monitoring a functional ability of a catalyst disposed in an exhaust duct of an internal combustion engine. The device includes a first measuring device for detecting, during a heating-up phase, a first variable characteristic of a temperature of the catalyst and a second measuring device for detecting, during the heating-up phase, a second variable, characteristic of a degree of conversion of the catalyst and is dependent on the first variable. A control unit, which uses a change in a dependency of the second variable on the first variable caused by aging of the catalyst, is provided to monitor the functional ability of the catalyst. The control unit is connected to the first measuring device and to the second measuring device.

In accordance with an added feature of the invention, the first measuring device has a temperature sensor for measuring a body temperature of the catalyst.

In accordance with an additional feature of the invention, the first measuring device measures a temperature of an exhaust gas and supplies measured values, from which a volume flow of the exhaust gas can be determined.

In accordance with another feature of the invention, the first measuring device measures a mass flow of an intake air of the internal combustion engine, a secondary-air mass flow metered to an exhaust-gas flow upstream of the catalyst, and a lambda value.

In accordance with a further feature of the invention, operating parameters of the internal combustion engine which are required for monitoring the catalyst are fed to the control unit.

In accordance with a further added feature of the invention, the control unit calculates an exhaust-gas temperature upstream of the catalyst from a model based on operating parameters of the internal combustion engine.

In accordance with a further additional feature of the invention, the second measuring device has a measurement sensor measuring a concentration of at least one pollutant component downstream of the catalyst.

In accordance with another added feature of the invention, the second measuring device has a further measurement sensor for measuring a concentration of the at least one pollutant component upstream of the catalyst.

In accordance with still another added feature of the invention, an operating control unit for the internal combustion engine is provided, and the control unit is integrated into the operation control unit of the internal combustion engine.

In accordance with an added feature of the invention, the catalyst is an oxidation catalyst or a reduction catalyst.

In accordance with another feature of the invention, a warning device is provided, and the control unit is connected to the warning device for indicating an inadequate functional ability of the catalyst.

In accordance with a concomitant feature of the invention, the control unit has a memory which can be read out during servicing of the internal combustion engine and in which an occurrence of inadequate functioning of the catalyst can be stored.

Other features which are considered as characteristic for the invention are set forth in the appended claims.

Although the invention is illustrated and described herein as embodied in a method and device for monitoring the functional ability of a catalyst of an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 5 is a graph indicating the results of measurements and illustrating the application of the method according to the invention to a three-way catalyst;

FIG. 6 is a graph indicating a mass emitted by the internal combustion engine as a function of the heat supplied to the catalyst; and FIG. 7 is a diagram indicating the results of measurements and illustrating the application of another embodiment of the method according to the invention in the case of the three-way catalyst.

DESCRIPTION OF THE PREFERRED EMBODIMENTS

Figure 1:
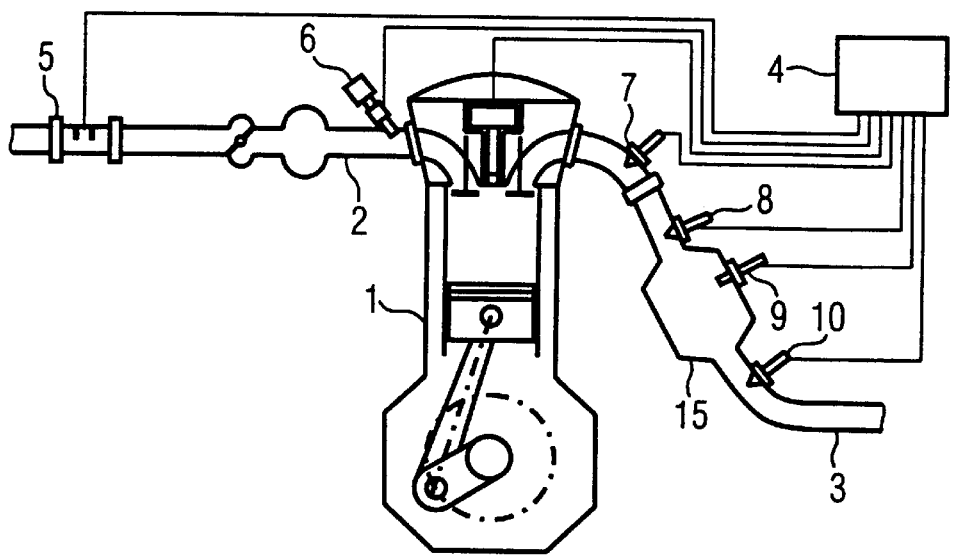
FIG. 1 is a diagrammatic, illustration of a device according to the invention for carrying out a method according to the invention.

In all the figures of the drawing, sub-features and integral parts that correspond to one another bear the same reference symbol in each case. Referring now to the figures of the drawing in detail and first, particularly, to FIGS. 1 and 2 thereof, there is shown a first exemplary embodiment of a method and a device for monitoring the functional ability of a catalyst 15.

As FIG. 1 shows, an internal combustion engine 1 has an intake duct 2 and an exhaust duct 3. Its operation is controlled or regulated by a control unit 4. The control unit 4 is supplied with a measured value from an intake-air mass sensor 5, which is disposed in the intake duct 2 of the internal combustion engine 1 and detects a mass flow of intake air. The control unit 4 furthermore controls an injection of fuel into the intake duct 2 via injection valves 6, and detects an oxygen content of an exhaust gas by a lambda probe 7 in order to regulate the operation of the internal combustion engine 1. The control unit 4 can be a stand-alone unit or be an integrated part of an operating control unit 4' of the internal combustion engine 1. Disposed in the exhaust duct 3 is the catalytic converter 15, the functional ability of which, i.e. degree of conversion of which, is to be monitored.

Figure 2:
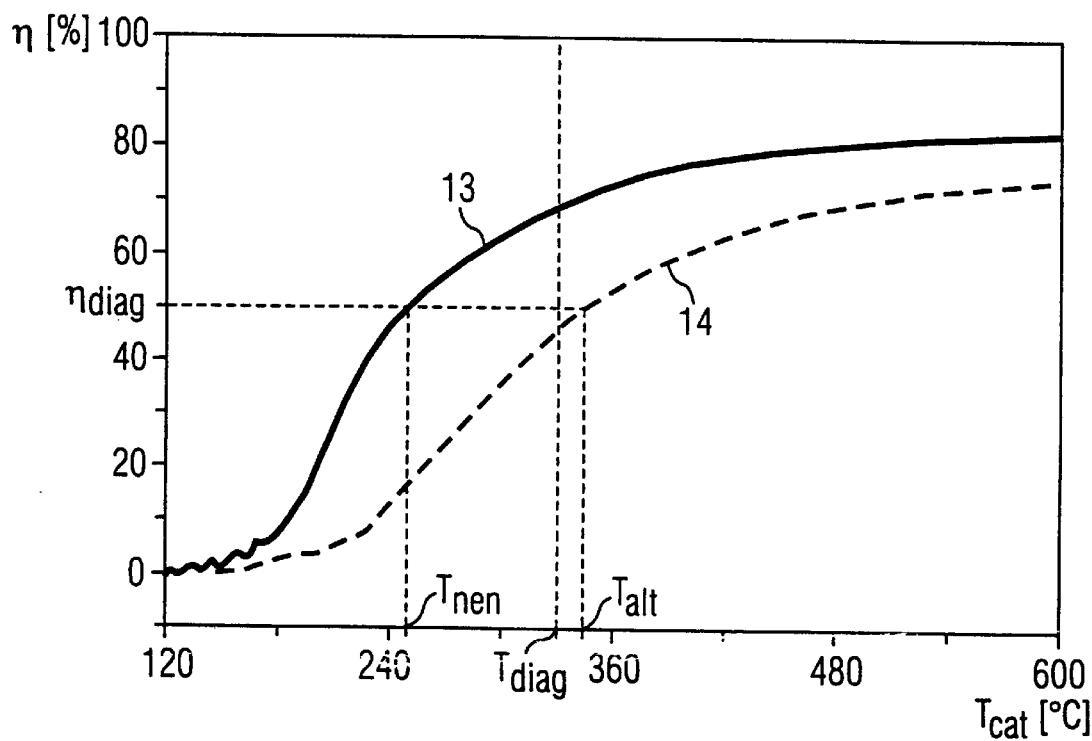
FIG. 2 is a graph indicating a variation in a degree of conversion of a catalyst as a function of a catalyst temperature.

The degree of conversion $\eta$ of the catalyst 15 depends directly on a temperature $T_{cat}$ of the catalyst 15. This relationship is illustrated in FIG. 2. Curve 13 shows a temperature dependency of the degree of conversion $\eta$ of a new catalyst.

Curve 14 describes an old catalyst that is not functional. As the catalyst temperature $T_{cat}$ rises, $\eta$ increases up to a maximum value. The profile above the temperature at which the maximum value is reached depends on the catalyst used. It is approximately constant in the case of a three-way catalyst whereas, in the case of a deNOx catalyst, it decreases.

The degree of conversion for a component is obtained from the following equation:

$$\eta_i = ([i]_{beforecat.} - [i]_{aftercat.}) [i]_{beforecat.} \tag{1}$$

where [i] represents a volume concentration of the pollutant component i. As the catalyst 15 ages, its activation energy decreases and the shape of the curve changes. The catalyst temperature $T_{cat}$ necessary for a particular degree of conversion $\eta_i$ increases and the maximum degree of conversion $\eta_{i,max}$, decreases; the curve spreads out, as can be seen in FIG. 2. The change in the degree of conversion as a function of temperature during ageing thus offers a way of monitoring the catalyst 15 for its ability to function.

To determine the temperature of the catalyst 15, its body temperature is measured by a temperature sensor 9, the measured value being fed to the control unit 4. To determine the concentration of a pollutant component in the exhaust gas and, from this, the degree Of conversion of the catalyst 15, a pollutant-concentration sensor 8 is disposed upstream of the catalyst 15, and a pollutant-concentration sensor 10 is disposed downstream of the catalyst 15. The sensors 8, 10 supply measured values to the control unit 4 as a function of the concentration of the pollutant component, e.g. the hydrocarbons (HC). The measured values are converted into the pollutant volume concentration by a mathematical function or a characteristic diagram. Possible pollutant-concentration sensors which detect the volume concentration of a pollutant component to be monitored in the exhaust gas are planar exhaust-gas sensors which indicate a change in the electrical conductivity of a metal oxide (e.g. doped SrTiO,) as a measurement signal. Also conceivable, however, are exhaust-gas sensors that use a solid-state electrolyte (e.g. stabilized $ZrO_2$ or $CeO_2$) as a measuring element. In the exemplary embodiment illustrated, there are two planar hydrocarbon sensors for a required OBD monitoring function.

Direct evaluation of the relationship $\eta_i(T_{cat})$ is performed by measuring the solid body temperature of the catalyst 15 by the temperature sensor 9 in the heating phase while the engine is warming up and, for this purpose, the degree of conversion $\eta$ is determined from the signals of the pollutant-concentration sensors 8, 10. For a given degree of conversion $\eta_{diag}$ a new catalyst has a much lower temperature $T_{new}$, than an older catalyst. If, as can be seen in FIG. 2, the temperature $T_{old}$ for the given degree of conversion $\eta_{diag}$ is above a temperature threshold $T_{diag}$, the catalyst is recognized as being defective. As an alternative, it is also possible to determine the degree of conversion $\eta$ at a given temperature $T_{diag}$ and for the catalyst to be recognized as defective when a specified threshold $\eta_{diag}$ is undershot.

Figure 3:
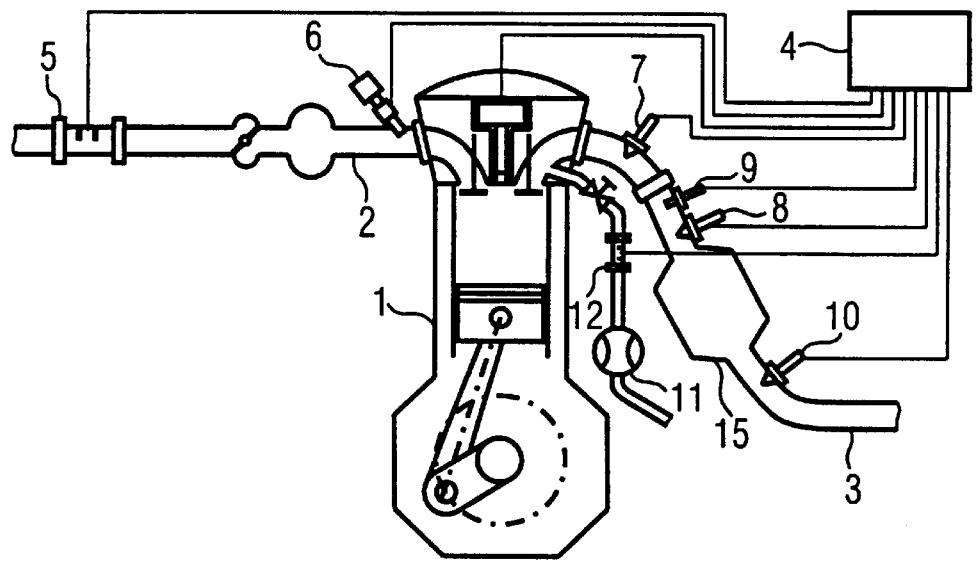
FIG. 3 is an illustration of another embodiment of the device according to the invention.
Figure 4:
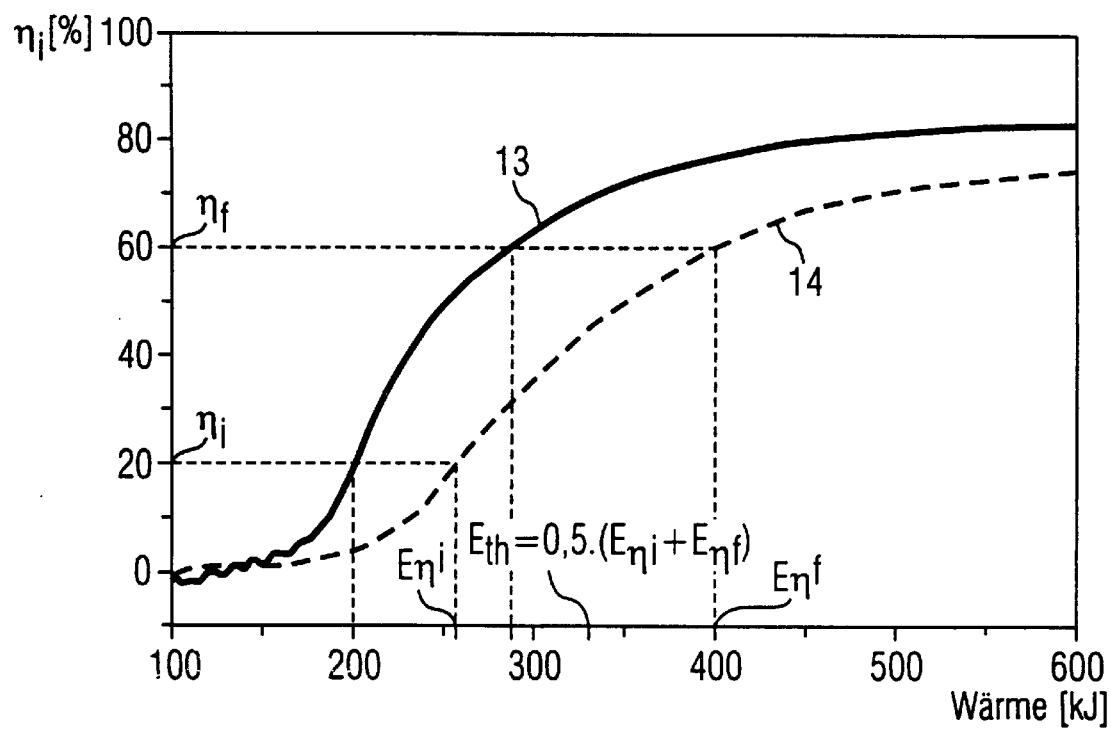
FIG. 4 is a graph indicating the variation in the degree of conversion of the catalyst as a function of heat supplied to the catalyst.

Another embodiment of the invention is described with reference to FIGS. 3 and 4. Elements that correspond to those in FIG. 1 are denoted by the same reference numerals and attention is drawn in this respect to the description of FIG. 1. In contrast to the device in FIG. 1, no temperature sensor 9 is provided at the catalyst 15. Instead, the temperature of the exhaust gas upstream of the catalyst 15 is detected by the control unit 4 using the temperature sensor 9. A secondary-air pump 11 is used to supply the exhaust gas upstream of the catalyst 15 with a secondary-air mass flow, which is measured by the secondary-air mass sensor 12, the measured value being fed to the control unit 4.

As an alternative to the dependence of the degree of conversion of the catalyst 15 on its body temperature, the dependence of the degree of conversion on the energy fed to the catalyst 15 is in this case used for diagnosis. The energy for heating up the catalyst 15 is fed to it in the form of heat by the exhaust gas. This heat can be determined from the exhaust-gas temperature upstream of the catalyst 15 and the exhaust-gas mass flow fed to the catalyst 15 in accordance with the following equation:

$$E = \int_{ti}^{tf} T_{exhaust\ gas} \cdot \left( \dot{M}_{intake} \cdot \left(1 + \frac{1}{L_0 \cdot \lambda}\right) + \dot{M}_{secondary} \right) \cdot C_p dt \tag{2}$$

where $T_{exhaust\ gas}$ represents the exhaust-gas temperature upstream of the catalyst 15, $M_{intake}$ represents the intake-air mass flow, $M_{secondary}$ represents the secondary-air mass, $C_p$ represents the heat capacity of the exhaust gas at a constant pressure, $\lambda$ represents an air ratio and $L_o$ represents the air mass per mass unit of fuel in the case of stoichiometric combustion. The heat $\Delta Q = E_{\eta f} - E_{\eta i}$ which is necessary to increase the degree of conversion of the catalyst from an initial value $\eta_i$, (heat $E_{\eta i}$) to a final value $\eta_f$ (heat $E_{\eta f}$) is higher in the case of an aged catalyst than in the case of a new catalyst, as can be seen in FIG. 4. The curves shown in FIG. 4 correspond to those in FIG. 2, with the difference that they are plotted against the heat fed to the catalyst 15 rather than against the body temperature. The energies $E_{\eta i}$ and $E_{\eta f}$, required to reach $\eta_i$ and $\eta_f$ are likewise higher in the case of an aged catalyst than in the case of a new catalyst. Their mean value $\eta_{th} = 0.5\ (E_{\eta i} + E_{\eta f})$ likewise rises with the aging of the catalyst. The product of the mean value and the heat $\Delta Q$ fed in is consequently a useful measure of the warm-up behavior of the catalyst and thus of its ability to function.

Catalyst diagnosis can be performed in a simple manner by setting a threshold value for the product. When the threshold is exceeded the catalyst is recognized as defective. However, since the heating-up of the catalyst is ultimately decisive for its degree of conversion, the thermal boundary conditions of the system are significant if the heat fed to the catalyst is used as a measure of its heating. To take account of these thermal boundary conditions, the diagnostic threshold can preferably be chosen as a function of temperature values of the internal combustion engine, e.g. coolant temperature, intake temperature, outside temperature or exhaust gas temperature when the internal combustion engine is put into operation. The control unit 4 contains a suitable characteristic diagram for this purpose. The driving profile of the vehicle speed of the vehicle in which the internal combustion engine is installed can furthermore be taken into account by a correction factor that can be stored in the control unit 4.

FIG. 5 shows measurement results that demonstrate the method according to the invention using the oxidation of hydrocarbons in a three-way catalyst as an example. The measurements were taken on an engine test bed and the set-up corresponds to that shown in FIG. 3. The internal combustion engine was started from cold (300° K) and ran at various constant speeds in order in this way to produce different heating profiles for the catalyst. Diagnosis was carried out at $\eta_i=20\%$ and $\eta_f=60\%$ for the concentration of hydrocarbon (HC). The hydrocarbon concentration upstream and downstream of the catalyst 15 was determined by a flame ionization detector (FID). Two catalysts were investigated. The new catalyst, measurement curve 13, has emissions of 50 mg HC per mile according to driving cycle FTP 75. The aged catalyst of measurement curve 14 achieves 100 mg HC per mile. The two catalysts can be distinguished well by the method according to the invention, as FIG. 5 shows.

In the exemplary embodiments described hitherto, two pollutant-concentration sensors are required in the exhaust gas. A more economical and therefore preferred solution is rovided by another embodiment, of the invention, in which the volume concentration of the pollutant component is measured only downstream of the catalyst 15. Otherwise, the device in this exemplary embodiment corresponds to the device in FIG. 3. For diagnosis, the preferred method is to determine the heat which must be fed to the catalyst to reduce the concentration $[i]_{after\ Cat}$ of the pollutant component i to be monitored from an initial value $[i]_i$ to a final value $[i]_f$. Since the concentration, in particular the volume concentration, is not a measure of the quantity of pollutant emitted, the mass of the component i is determined from the concentration using the following equation:

$$mass = \int_{[i]_i}^{[i]_f} [i] \cdot \left( \dot{M}_{intake} \cdot \left(1 + \frac{1}{L_0 \cdot \lambda}\right) + \dot{M}_{secondary} \right) \cdot \frac{M_i}{M_{exhaust\ gas}} dt, \quad (3)$$

where Mi is the molar mass of the component i, $M_{exhaust\ gas}$ the molar mass of the exhaust gas and all the other designations correspond to those in equation (2). in order to take account of the variation of the energy supply with time, in particular load effects, $mass_i$ is multiplied by the mean thermal energy $E_{th}$ as in the previous exemplary embodiment. The product of $massi * E_{th}$ is once again a measure of the functional ability of the catalyst 15. When a threshold value is exceeded, the catalyst 15 is recognized as defective. In order once again to take account of the thermal boundary conditions of the system, the diagnostic threshold is defined as a function of temperature values of the internal combustion engine, e.g. coolant temperature, intake air temperature, outside temperature or exhaust-gas temperature of the internal combustion engine before starting, and stored in a characteristic diagram in the control unit 4. The driving profile of a vehicle fitted with the internal combustion engine can once again be taken into account during diagnosis by a speed-dependent correction factor.

FIG. 7 shows the results of measurement, which demonstrate the use of the method from the example of oxidation of hydrocarbons in a three-way catalyst. The measurements were taken on a roller test bed and the set-up corresponds to that in FIG. 3 without the pollutant-concentration sensor 8 upstream of the catalyst 15. In this exemplary embodiment, the pollutant-concentration sensor 10 downstream of the catalyst 15 is a resistive planar sensor. In tests Nos. 1, 2 and 5, a new catalyst was investigated and, in tests 3, 4 and 6 in FIG. 7, an old catalyst was investigated. In tests 1 and 2, and 3 and 4 respectively, successive driving cycles FTP 75 were performed and, following these tests, in tests 5 and 6 respectively, the internal combustion engine was run at idle for 60 seconds. As can be seen, the tests with the aged catalyst significantly overshoot the threshold value of 110 g kJ, while the tests with the new catalyst show values which lie significantly below this. This makes it possible to distinguish an old catalyst that is no longer functional from a new one. The result of the functional check can be indicated to the operator of the internal combustion engine 1 or of a vehicle fitted with it by a warning device 20 (see FIG. 3). As an alternative, the control unit 4 can have a memory 21 in which a verdict on the ability to function of the internal combustion engine 1 is stored, it being possible to read out this verdict during a service, for-example.

It should be pointed out that the measurement of the exhaust-gas temperature in the method described above can be replaced by a model-based calculation of the exhaust-gas temperature from operating parameters of the internal combustion engine. It should furthermore be pointed out that the control unit 4 can be integrated, into the operating control unit of the internal combustion engine or into an independent unit.

I claim:

1. A method for monitoring a functional ability of a catalyst disposed in an exhaust duct of an internal combustion engine, which comprises the steps of:

determining by continuous measurements during a heating-up phase of the catalyst, a first variable that is characteristic of a temperature of the catalyst;

determining by continuous measurements during the heating-up phase of the catalyst, a second variable that is characteristic of a degree of conversion of the catalyst and is dependent on the first variable;

using a change in a dependency of the second variable on the first variable caused by aging of the catalyst to monitor the functional ability of the catalyst;

using heat fed to the catalyst as the first variable; and determining the heat fed to the catalyst by the following steps:

determining an exhaust-gas temperature upstream of the catalyst;

determining a volume flow of exhaust gas fed to the catalyst; and calculating the heat fed to the catalyst from the exhaust-gas temperature, the volume flow and a heat capacity of the exhaust gas.

2. The method according to claim 1, which comprises calculating the exhaust-gas temperature upstream of the catalyst by use of a model based on operating parameters of the internal combustion engine.

3. The method according to claim 1, which comprises using a value for the heat fed to the catalyst which has been corrected with respect to external influences by a correction factor as the first variable.

4. The method according to claim 1, which comprises using the degree of conversion of the catalyst as the second variable.

5. The method according to claim 1, which comprises detecting a concentration of at least one pollutant component in an exhaust gas downstream of the catalyst for determining the second variable.

6. The method according to claim 5, which comprises detecting a further concentration of the pollutant component in the exhaust gas upstream of the catalyst, and determining the degree of conversion of the catalyst from a difference between the concentration and the further concentration.

7. The method according to claim 1, which comprises using a mass of at least on e pollutant component in an exhaust gas downstream of the catalyst as the second variable.

8. The method according to claim 1, which comprises determining the dependency of the second variable on the first variable at a specified point.

9. A method for monitoring a functional ability of a catalyst disposed in an exhaust duct of an internal combustion engine, which comprises the steps of:
   determining by continuous measurements during a heating-up phase of the catalyst, a first variable that is characteristic of a temperature of the catalyst;
   determining by continuous measurements during the heating-up phase of the catalyst, a second variable that is characteristic of a degree of conversion of the catalyst and is dependent on the first variable;
   using a change in a dependency of the second variable on the first variable caused by aging of the catalyst to monitor the functional ability of the catalyst;
   using heat fed to the catalyst as the first variable; and
   determining the heat fed to the catalyst only after a cold start of the internal combustion engine, when no more latent heat is being absorbed due to an evaporation of condensates in the catalyst.

10. The method according to claim 9, which comprises using a value for the heat fed to the catalyst which has been corrected with respect to external influences by a correction factor as the first variable.

11. The method according to claim 9, which comprises using the degree of conversion of the catalyst as the second variable.

12. The method according to claim 9, which comprises detecting a concentration of at least one pollutant component in an exhaust gas downstream of the catalyst for determining the second variable.

13. The method according to claim 12, which comprises detecting a further concentration of the pollutant component in the exhaust gas upstream of the catalyst, and determining the degree of conversion of the catalyst from a difference between the concentration and the further concentration.

14. The method according to claim 9, which comprises using a mass of at least one pollutant component in an exhaust gas downstream of the catalyst as the second variable.

15. A method for monitoring a functional ability of a catalyst disposed in an exhaust duct of an internal combustion engine, which comprises the steps of:
   determining by continuous measurements during a heating-up phase of the catalyst, a first variable that is characteristic of a temperature of the catalyst;
   determining by continuous measurements during the heating-up phase of the catalyst, a second variable that is characteristic of a degree of conversion of the catalyst and is dependent on the first variable;
   using a change in a dependency of the second variable on the first variable caused by aging of the catalyst to monitor the functional ability of the catalyst;
   using a mass of at least one pollutant component in an exhaust gas downstream of the catalyst as the second variable; and
   performing the following steps for determining the mass of the pollutant component:
      determining an exhaust-gas volume flow fed to the catalyst;
      converting the exhaust-gas volume flow into a mass flow; and
      calculating a product of the mass flow and a concentration of the pollutant component in the exhaust gas downstream of the catalyst and integrating the product.

16. The method according to claim 15, which comprises multiplying the mass of the at least one pollutant component in the exhaust gas downstream of the catalyst by the first variable resulting in a product, and using the product to monitor the functional ability of the catalyst.

17. The method according to claim 15, which comprises determining the dependency of the second variable on the first variable at a specified point.

18. A method for monitoring a functional ability of a catalyst disposed in an exhaust duct of an internal combustion engine, which comprises the steps of:
   determining by continuous measurements during a heating-up phase of the catalyst, a first variable that is characteristic of a temperature of the catalyst;
   determining by continuous measurements during the heating-up phase of the catalyst, a second variable that is characteristic of a degree of conversion of the catalyst and is dependent on the first variable;
   using a change in a dependency of the second variable on the first variable caused by aging of the catalyst to monitor the functional ability of the catalyst;
   using a mass of at least one pollutant component in an exhaust gas downstream of the catalyst as the second variable; and
   multiplying the mass of the at least one pollutant component in the exhaust gas downstream of the catalyst by the first variable resulting in a product, and using the product to monitor the functional ability of the catalyst.

19. The method according to claim 18, which comprises determining the dependency of the second variable on the first variable at a specified point.

* * * * *